United States Patent
Davain et al.

(10) Patent No.: US 10,598,495 B2
(45) Date of Patent: Mar. 24, 2020

(54) METHOD FOR DESIGNING A NAVIGATION PATH AND METHOD FOR ORIENTING A SIGHTING MEMBER FROM SAID NAVIGATION PATH

(71) Applicant: SAFRAN ELECTRONICS & DEFENSE, Boulogne Billancourt (FR)

(72) Inventors: Loic Davain, Boulogne Billancourt (FR); Simon Fabien, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 15/773,781

(22) PCT Filed: Nov. 9, 2016

(86) PCT No.: PCT/EP2016/077178
§ 371 (c)(1),
(2) Date: May 4, 2018

(87) PCT Pub. No.: WO2017/081104
PCT Pub. Date: May 18, 2017

(65) Prior Publication Data
US 2018/0321040 A1 Nov. 8, 2018

(30) Foreign Application Priority Data
Nov. 10, 2015 (FR) .................................... 15 60751

(51) Int. Cl.
*G01C 21/16* (2006.01)
*G01C 25/00* (2006.01)
(52) U.S. Cl.
CPC ........... *G01C 21/165* (2013.01); *G01C 25/00* (2013.01)

(58) Field of Classification Search
None
See application file for complete search history.

(56) References Cited

U.S. PATENT DOCUMENTS

| 6,037,893 | A | * | 3/2000 | Lipman | ................ | G01C 21/165 |
| | | | | | | 342/25 F |
| 6,278,945 | B1 | * | 8/2001 | Lin | ...................... | G01C 21/165 |
| | | | | | | 701/472 |

(Continued)

FOREIGN PATENT DOCUMENTS

FR 2 781 888 A1 2/2000

OTHER PUBLICATIONS

Masters, Jeffrey M. et al., : "Correction of Inertial Navigation with Loran C on NOAA's P-3 Aircraft", Journal of Atmospheric and Oceanic Technology, Apr. 1, 1993, pp. 145-154, vol. 10, No. 2.

(Continued)

*Primary Examiner* — Abdhesh K Jha
(74) *Attorney, Agent, or Firm* — Muncy, Geissler, Olds & Lowe, P.C.

(57) ABSTRACT

A method of performing a navigation calculation on the basis of a hybrid inertial navigation system on board a vehicle includes performing a hybrid first navigation calculation and an inertial second navigation calculation, calculating in real time a difference between the first navigation calculation and the second navigation calculation, and subjecting the difference to lowpass filtering having a convergence time longer than a period of the Kalman filter and shorter than the Schuler period, and using the filtered difference to correct the second navigation calculation.

3 Claims, 2 Drawing Sheets

(56) References Cited

U.S. PATENT DOCUMENTS

| | | | | |
|---|---|---|---|---|
| 6,311,129 B1* | 10/2001 | Lin | ......................... | G09B 9/08 |
| | | | | 342/422 |
| 2001/0020216 A1* | 9/2001 | Lin | ...................... | G01C 21/165 |
| | | | | 701/472 |
| 2008/0091351 A1* | 4/2008 | Hoshizaki | ............ | G01C 21/165 |
| | | | | 701/478.5 |

OTHER PUBLICATIONS

Davain, L. et al., "Dedicated algorithm for line of sight stabilization and orientation", 2015 DGON Inertial Sensors and Systems Symposium (ISS), IEEE, Sep. 22, 2015, pp. 1-22.

* cited by examiner

METHOD FOR DESIGNING A NAVIGATION PATH AND METHOD FOR ORIENTING A SIGHTING MEMBER FROM SAID NAVIGATION PATH

The present invention relates to performing a navigation calculation from inertial navigation data and from non-inertial navigation data. The term "navigation" is used herein to cover the positioning, speed, and attitude data of a carrier of a navigation system. By way of example, the navigation may be used for pointing an aiming device, for aiming a weapon, or for aligning one inertial unit on another.

STATE OF THE ART

In the above-mentioned first application, i.e. pointing an aiming line on the basis of navigation data, it is known by way of example to use an aiming device in the form of a gyro-stabilized optronic ball on board a carrier vehicle such as an aircraft. The optronic ball is pointed by a set of motors arranged to aim at a target and to maintain the aim independently of the movements of the carrier vehicle, e.g. for tracking applications. Thus, the optronic ball is pointed relative to the carrier vehicle in order to compensate for the movements of the carrier vehicle.

To do this, the control of the optronic ball incorporates a servo-control loop that makes use of attitude data provided by the navigation system of the carrier vehicle in order to point the optronic ball as a function of the attitude of the carrier vehicle.

There exist two main types of navigation system: pure inertial navigation systems that make of data only from one or more inertial units; and hybrid navigation systems that make use of a Kalman filter to mix data from an inertial unit with data from other sensors (e.g. a sensor for sensing the speed of the vehicle or a receiver for receiving geolocation satellite signals).

Pure inertial navigation has little noise but presents large errors, in particular in terms of angular drift. The use of pure inertial data for pointing the optronic ball therefore gives rise to an offset from the target in the image, the target rapidly leaving the field of the image. Under such circumstances, provision is made for compensating manual control to be performed by an operator.

Hybrid navigation is accurate, but it presents large variations in values when resetting the Kalman filter. The use of hybrid data for pointing the optronic ball thus makes it possible to keep the target in the center of the image, but with regular movement of the field of view, which is found to be troublesome and visually fatiguing in use for a human operator.

The second above-mentioned application, i.e. aligning an inertial navigation system on a navigation reference, takes place when a carrier vehicle carries both a pure inertial navigation system for reference purposes and a hybrid navigation system. It is then common practice to align the hybrid navigation system on the reference navigation system from the pure inertial navigation data that it supplies. Specifically, resetting the hybrid navigation of the reference unit is perceived by the navigation system that is being aligned as resulting from behavior that is dynamic, which disturbs its operation. The use of pure inertial navigation data provided by the reference navigation unit for aligning the navigation unit that is to be aligned is also not ideal since it induces a large amount of drift in the navigation system during alignment. These errors are characterized by oscillation at the Schuler period (period of 84 minutes (min)). It is thus necessary under all circumstances to perform specific resetting at the end of alignment.

A method of compensating movements of a carrier vehicle for use with synthetic antenna radars is also known from document FR-A-2 781 888. That method makes provision for combining purely inertial navigation with hybrid navigation while involving a Kalman filter. In that Document, the updating normally provided by the Kalman filter is not available during the period in which radar images are being formed.

OBJECT OF THE INVENTION

It would therefore be advantageous to have a navigation system available that does not present the sudden changes due to resetting the Kalman filter.

BRIEF SUMMARY OF THE INVENTION

To this end, the invention provides a method of performing a navigation calculation on the basis of a hybrid inertial navigation system on board a vehicle, the navigation system being arranged to perform a hybrid first navigation calculation using a Kalman filter that receives inertial navigation data and non-inertial navigation data. The method comprises the steps of:
  using the hybrid inertial navigation system to perform an inertial second navigation calculation on the basis of the inertial navigation data;
  calculating in real time a difference between the first navigation calculation and the second navigation calculation, and subjecting the difference to lowpass filtering having a convergence time longer than the period of the Kalman filter and shorter than the Schuler period; and
  using the filtered difference to correct the second navigation calculation.

Thus, the corrected second navigation calculation benefits from the absence of noise in a purely inertial navigation calculation (the non-corrected second navigation calculation) and from the accuracy of a hybrid navigation calculation (the first navigation calculation). The difference between the two navigation calculations is also calculated in real time in such a manner that the corrected second navigation calculation is available at all times. The time constant of the lowpass filter is selected for each application as a function of the expected noise level and of the accuracy level for the corrected second navigation calculation.

The invention also provides a method of pointing an aiming device on board a vehicle provided with a hybrid inertial navigation system performing the above method, and in which the corrected second navigation calculation is used for pointing the aiming device.

The invention also provides a method of aligning a first inertial navigation system on a second inertial navigation system that is a hybrid system performing the above method, and in which the first inertial navigation system is aligned on the corrected second navigation calculation.

Other characteristics and advantages of the invention appear on reading the following description of particular, non-limiting implementations of the invention.

BRIEF DESCRIPTION OF THE FIGURES

Reference is made to the accompanying drawings, in which.

DETAILED DESCRIPTION OF THE INVENTION

Figure 1:
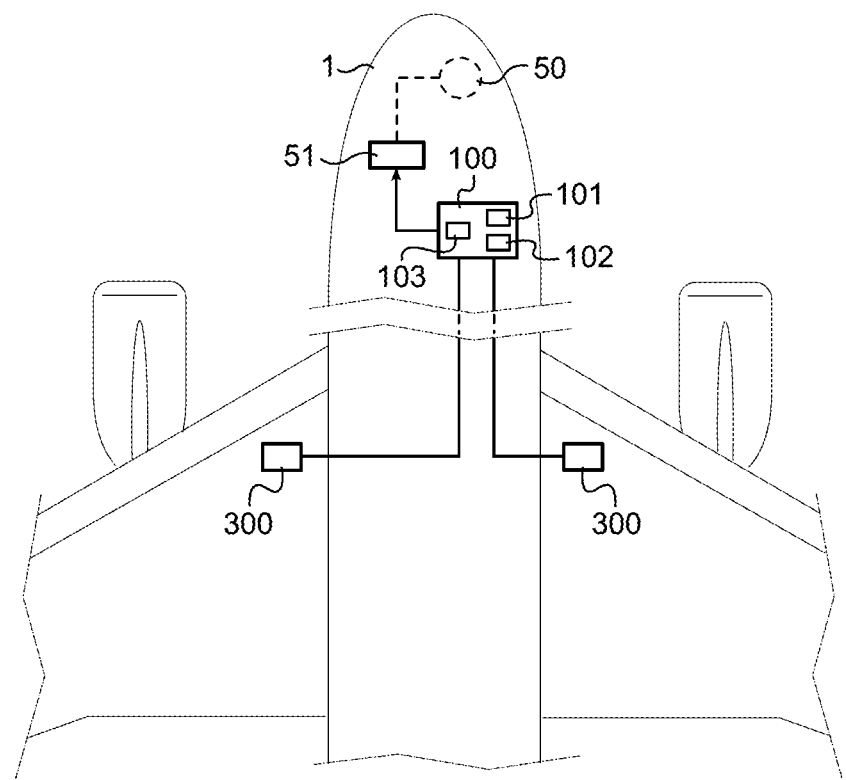
FIG. 1 is a diagrammatic view of a vehicle fitted with an aiming device for a first implementation of the method of the invention.
Figure 2:
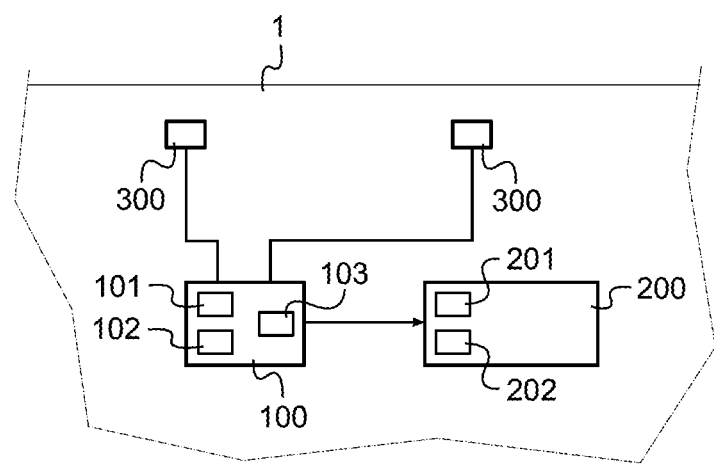
FIG. 2 is a diagrammatic view of a vehicle fitted with two inertial navigation systems for a second implementation of the method of the invention.

Two implementations of the invention are described below with reference respectively to FIGS. 1 and 2.

In the first implementation, the invention is described with reference to FIG. 1 in application to an aircraft 1 that is provided with:
- an aiming device in the form of a gyro-stabilized and motor-driven optronic ball 50 that needs to be pointed;
- a first navigation system 100; and
- navigation data sensors 300, such as for example a receiver for geolocation satellite signals, a speed sensor, a barometric altimeter, . . . .

The motor drive of the optronic ball 50 is connected to a control device 51 arranged in the cockpit of the aircraft and enabling an operator to point the optronic ball 50 and view the images captured by said optronic ball 50.

The navigation system 100 is a hybrid navigation system comprising a processor unit 101 connected to an inertial core 102, itself known, and also connected to sensors 300.

The navigation system 100 also has a processor unit 103 connected to the processor unit 101 in order to exchange information therewith.

The processor units 101 and 103 are connected to a piloting unit 51 enabling the pilot of the aircraft to program a route to be followed and to access navigation data.

The physical structure of the various above-specified elements is itself known and is not described in greater detail herein.

The processor unit 101 calls on a Kalman filter in order to act in known manner to perform a hybrid first navigation calculation N1 on the basis of inertial navigation data provided by the inertial core 102 and of non-inertial navigation data provided by the sensors 300.

The processor unit 103 is arranged to provide the control device 51 with corrected navigation calculation N2c that is calculated in a manner that is explained below with reference to FIG. 3.

While the optronic ball 50 is in use, it is possible to aim a zone of the field covered by the optronic ball and to control the motor drive of the optronic ball 50 so as to keep said element at the center of the field that is covered regardless of the movements of the aircraft. The control device 51 is programmed to control the motor drive of the optronic ball 50 by using the corrected navigation calculation N2c as provided thereto by the processor unit 103.

In the second implementation, the invention is described with reference to FIG. 2 in application of an aircraft 1 fitted with:
- a first navigation system 100;
- navigation data sensors 300 such as, for example, a receiver of geolocation satellite signals, a speed sensor, a barometer altitude sensor, . . . ; and
- a second navigation system 200 that is to be aligned.

The navigation system 100 is a hybrid navigation system comprising a processor unit 101 connected to an inertial core 102, itself known, and to the sensors 300.

The navigation system 100 also has a processor unit 103 connected to the processor unit 101.

The processor units 101 and 103 are connected to the second navigation system 200, which comprises a processor unit 201 connected to an inertial core 202 that is itself known.

The physical structure of the various elements set out above is itself known and is not described in greater detail herein.

The processor unit 101 calls on a Kalman filter for acting in known manner to perform a hybrid first navigation calculation N1 on the basis of inertial navigation data provided by the inertial core 102 and of non-inertial navigation data provided by the sensors 300.

The processor unit 103 is arranged to provide the second navigation system 200 with a corrected navigation calculation N2c, calculated in a manner that is described below with reference to FIG. 3.

The navigation system 200 uses the corrected navigation calculation N2c provided by the processor unit 103 in order to align itself on the navigation system 100. The alignment process is itself known and is not described in greater detail herein.

Figure 3:
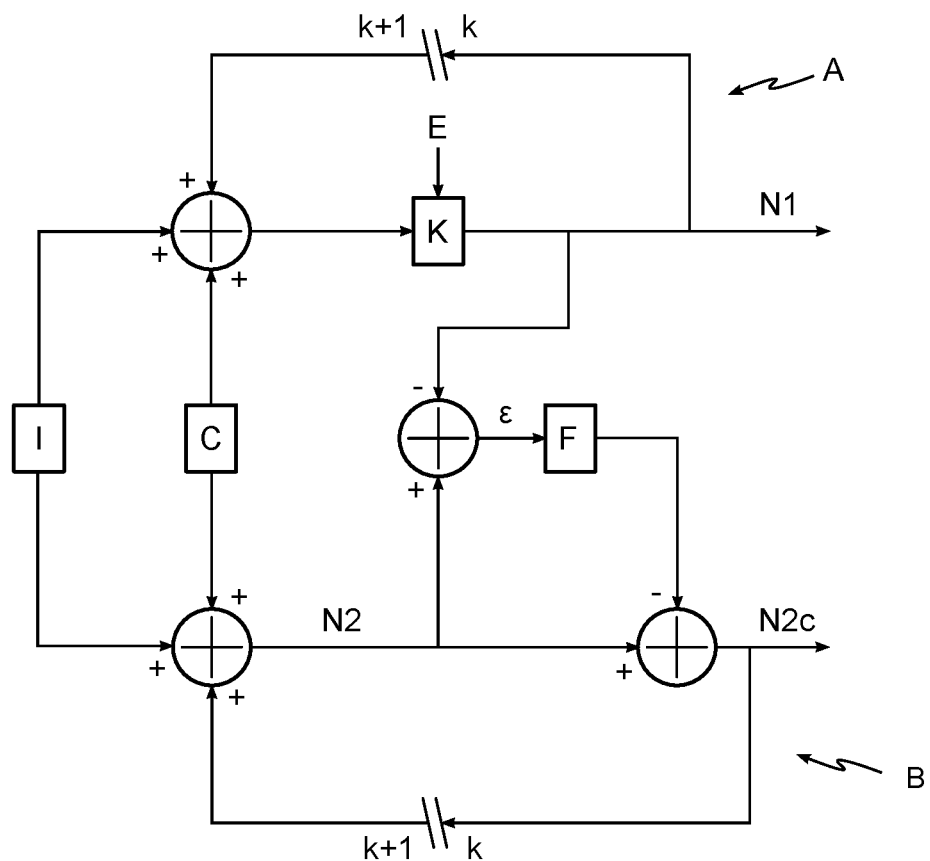
FIG. 3 is a diagram showing the navigation calculation process for these two implementations of the invention.

FIG. 3 shows the process for calculating the corrected navigation calculation N2c in accordance with the invention.

The calculation performed by the processor unit 101 performing the first navigation calculation N1 is symbolized by the loop A incorporating the Kalman filter K receiving inertial navigation data I and non-inertial navigation data E. The calculation performed at each instant k is used as the basis for the calculation performed at instant k+1. The first navigation calculation N1 is thus a hybrid navigation calculation.

In accordance with the invention, the processor unit 103 is programmable to perform a second navigation calculation N2 that is inertial, on the basis of inertial navigation data. The way in which the second navigation calculation N2 is performed is conventional.

In FIG. 3, this calculation is symbolized by the loop B receiving the inertial navigation data I (the same inertial data as received by the processor unit 101). The calculation performed at each instant k acts as the basis for the calculation performed at instant k+1. The second navigation calculation N2 is thus an inertial navigation calculation.

It should be observed that the loops A and B are affected by the same bias, symbolized at C.

The processor unit 103 is also programmed to act in real time to calculate a difference 8 between the first and second navigation calculations N1 and N2 and to perform lowpass filtering F on that difference with a convergence time that is long compared with the period of the Kalman filter K and short compared with the Schuler period. It should be recalled that the Schuler period is 84 minutes, whereas the period of the Kalman filter is a few seconds. The convergence time is thus determined by way of example using the Monte Carlo method to estimate the level of performance of the navigation calculations performed on a simulator representative of the navigation system and on the basis of inertial measurements affected by errors that are selected randomly.

The processor unit 103 uses the filtered difference 8 to correct the second navigation calculation N2 and obtain a corrected navigation calculation N2c. The difference 8 is the result of subtracting the first navigation calculation N1 from the second navigation calculation N2 and the navigation calculation N2c is the result of subtracting the filtered difference 8 from the second navigation calculation N2.

In this example, the corrected navigation calculation N2c is used for two operations.

While the optronic ball 50 is in use, it is possible to aim at a zone of the field covered by the optronic ball and to control the motor drive of the optronic ball 50 so as to keep said element at the center of the field covered regardless of the movements of the aircraft. The control device 51 is programmed to control the motor drive of the optronic ball 50 while using the third navigation calculation N2c.

In a variant, in the second implementation, if the corrected navigation calculation N2c is prepared from the beginning of alignment, it is possible to make provision to select a convergence time that is initially equal to the period of the Kalman filter and then to lengthen it in application of a time variation relationship towards the optimum value as obtained by simulation.

Naturally, the present invention is not limited to the implementations described, but covers any variant coming within the field of the invention as defined by the claims.

In particular, the corrected second navigation calculation N2c may be used for pointing the aim, for alignment, or for other applications.

It is possible to combine both implementations in a single carrier vehicle.

The processor units 101 and 103 may comprise a single processor unit.

The invention is applicable to carriers other than aircraft.

The invention claimed is:

1. A method of pointing an aiming device on board a vehicle provided with a hybrid inertial navigation system arranged to perform a hybrid first navigation calculation using a Kalman filter that receives inertial navigation data the method comprising steps of:
   using the hybrid inertial navigation system to perform an inertial second navigation calculation on the basis of the inertial navigation data;
   calculating in real time a difference between the first navigation calculation and the second navigation calculation, and subjecting the difference to lowpass filtering having a convergence time longer than a period of the Kalman filter and shorter than a Schuler period; and
   using the filtered difference to correct the second navigation calculation; and
   using the corrected second navigation calculation for pointing the aiming device.

2. A method of resetting a second inertial navigation system with a first navigation system that is a hybrid system arranged to perform a hybrid first navigation calculation using a Kalman filter that receives inertial navigation data and non-inertial navigation data, the method comprising the steps of:
   using the second inertial navigation system to perform an inertial second navigation calculation on the basis of the inertial navigation data;
   calculating in real time a difference between the first navigation calculation and the second navigation calculation, and subjecting the difference to lowpass filtering having a convergence time longer than a period of the Kalman filter and shorter than a Schuler period; and
   using the filtered difference to correct the second navigation calculation for resetting
   the second inertial navigation system with the first navigation system.

3. A method according to claim 2, wherein the corrected second navigation calculation is prepared from the beginning of alignment, with the convergence time of the lowpass filter initially being selected to be equal to the period of the Kalman filter, and with the convergence time subsequently being a second time that is increased in application of a time variation relationship towards a predetermined value.

* * * * *